US011052603B2

(12) United States Patent
Hambling et al.

(10) Patent No.: US 11,052,603 B2
(45) Date of Patent: Jul. 6, 2021

(54) ADDITIVE MANUFACTURING SYSTEM HAVING STOWABLE CUTTING MECHANISM

(71) Applicant: CC3D LLC, Coeur d'Alene, ID (US)

(72) Inventors: Colin Hugh Hambling, Medina, WA (US); Trevor David Budge, Coeur d'Alene, ID (US); Nathan Andrew Stranberg, Post Falls, ID (US); Andrew John Overby, Coeur d'Alene, ID (US)

(73) Assignee: Continuous Composites Inc., Couer d'Alene, ID (US)

( * ) Notice: Subject to any disclaimer, the term of this patent is extended or adjusted under 35 U.S.C. 154(b) by 113 days.

(21) Appl. No.: 16/382,054

(22) Filed: Apr. 11, 2019

(65) Prior Publication Data

US 2019/0375154 A1    Dec. 12, 2019

Related U.S. Application Data

(60) Provisional application No. 62/681,776, filed on Jun. 7, 2018.

(51) Int. Cl.
*B29C 64/209* (2017.01)
*B29C 64/30* (2017.01)
(Continued)

(52) U.S. Cl.
CPC .......... *B29C 64/209* (2017.08); *B29C 64/393* (2017.08); *B33Y 30/00* (2014.12); *B33Y 50/02* (2014.12); *B29K 2105/08* (2013.01)

(58) Field of Classification Search
CPC ... B29C 64/209; B29C 64/393; B29C 64/307; B29C 64/165; B29C 70/38; B33Y 10/00;
(Continued)

(56) References Cited

U.S. PATENT DOCUMENTS 3,286,305 A    11/1966 Seckel
3,809,514 A    5/1974 Nunez
(Continued)

FOREIGN PATENT DOCUMENTS

DE    4102257 A1    7/1992
EP    2589481 B1    1/2016
(Continued)

OTHER PUBLICATIONS

International Search Report dated Jul. 15, 2019 for PCT/US2019/027750 to CC3D LLC Filed Apr. 16, 2019.
(Continued)

*Primary Examiner* — Jacob T Minskey
*Assistant Examiner* — Baileigh Kate Darnell
(74) *Attorney, Agent, or Firm* — Ryan C. Stockett (57) ABSTRACT

An additive manufacturing system is disclosed for use in fabricating a composite structure. The additive manufacturing system may include a print head configured to discharge a continuous reinforcement that is at least partially wetted with a matrix, and a support configured to move the print head in at least one dimension during discharge. The additive manufacturing system may also include a cutting mechanism connected to at least one of the print head and the support. The cutting mechanism may be configured to selectively sever the continuous reinforcement from the print head. The cutting mechanism may include a cutting implement, a first actuator configured to move the cutting implement from a stowed position to a deployed position, and a second actuator configured to engage the cutting implement with the continuous reinforcement.

20 Claims, 5 Drawing Sheets

(51) Int. Cl.
  *B33Y 30/00* (2015.01)
  *B29C 64/393* (2017.01)
  *B33Y 50/02* (2015.01)
  *B29K 105/08* (2006.01)

(58) Field of Classification Search
  CPC ......... B33Y 30/00; B33Y 40/00; B33Y 50/02; B29K 2105/08
  See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0165666 A1 | 6/2015 | Butcher et al. |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |

(56) References Cited

U.S. PATENT DOCUMENTS

| | | |
|---|---|---|
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

ADDITIVE MANUFACTURING SYSTEM HAVING STOWABLE CUTTING MECHANISM

RELATED APPLICATIONS

This application is based on and claims the benefit of priority from U.S. Provisional Application No. 62/681,776 that was filed on Jun. 7, 2018, the contents of which are expressly incorporated herein by reference.

TECHNICAL FIELD

The present disclosure relates generally to additive manufacturing and, more particularly, to a system for additively manufacturing a continuous-fiber composite structure and a stowable mechanism for cutting the continuous fiber.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a heat sink, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength and free-space fabrication, the continuous fiber discharging from the print head may need to be severed at the end of each fabrication pass. The disclosed system and cutting mechanism are directed to addressing this issue and/or other problems of the prior art.

SUMMARY

In one aspect, the present disclosure is directed to a system for additively manufacturing a composite structure. The system may include a print head configured to discharge a continuous reinforcement that is at least partially wetted with a matrix, and a support configured to move the print head in at least one dimension during discharge. The system may also include a cutting mechanism connected to at least one of the print head and the support. The cutting mechanism may be configured to selectively sever the continuous reinforcement from the print head. The cutting mechanism may include a cutting implement, a first actuator configured to move the cutting implement from a stowed position to a deployed position, and a second actuator configured to engage the cutting implement with the continuous reinforcement.

In another aspect, the present disclosure is directed to another system for additively manufacturing a composite structure. This system may include a print head configured to discharge a continuous reinforcement that is at least partially wetted with a matrix, a support configured to move the print head in multiple dimensions during discharge, and a cure enhancer configured to initiate curing of the matrix at discharge. The system may also include a cutting mechanism connected to at least one of the print head and the support. The cutting mechanism may be configured to selectively sever the continuous reinforcement from the print head. The cutting mechanism may include shears, a first actuator configured to move the shears from a stowed position to a deployed position, and a second actuator configured to at least one of open and close the shears. The system may additionally include a controller configured to cause the support to move the print head, to selectively energize the first and second actuators, and to selectively activate the cure enhancer.

In yet another aspect, the present disclosure is directed to another system for additively manufacturing a composite structure. This system may include a print head configured to discharge a continuous reinforcement that is at least partially wetted with a matrix, a support configured to move the print head in multiple dimensions during discharge, and a cure enhancer configured to initiate curing of the matrix at discharge. The system may also include a controller configured to selectively activate the cure enhancer, and to selectively cause the print head to discharge the continuous reinforcement and the matrix in overlapping layers to increase a z-height dimension. The controller may also be configured to selectively cause the support to step the print head a distance in the z-height dimension between each overlapping layer, and to selectively adjust the distance of the step as a function of at least one of the z-height dimension and a number of layers overlapping in the z-height dimension.

BRIEF DESCRIPTION OF THE DRAWINGS

FIGS. 4, 5, 6, 7, 8, and 9 are side-, enlarged-, and isometric-view illustrations of another exemplary print head and cutting mechanism that may be utilized with the additive manufacturing system of FIG. 1.

DETAILED DESCRIPTION

Figure 1:
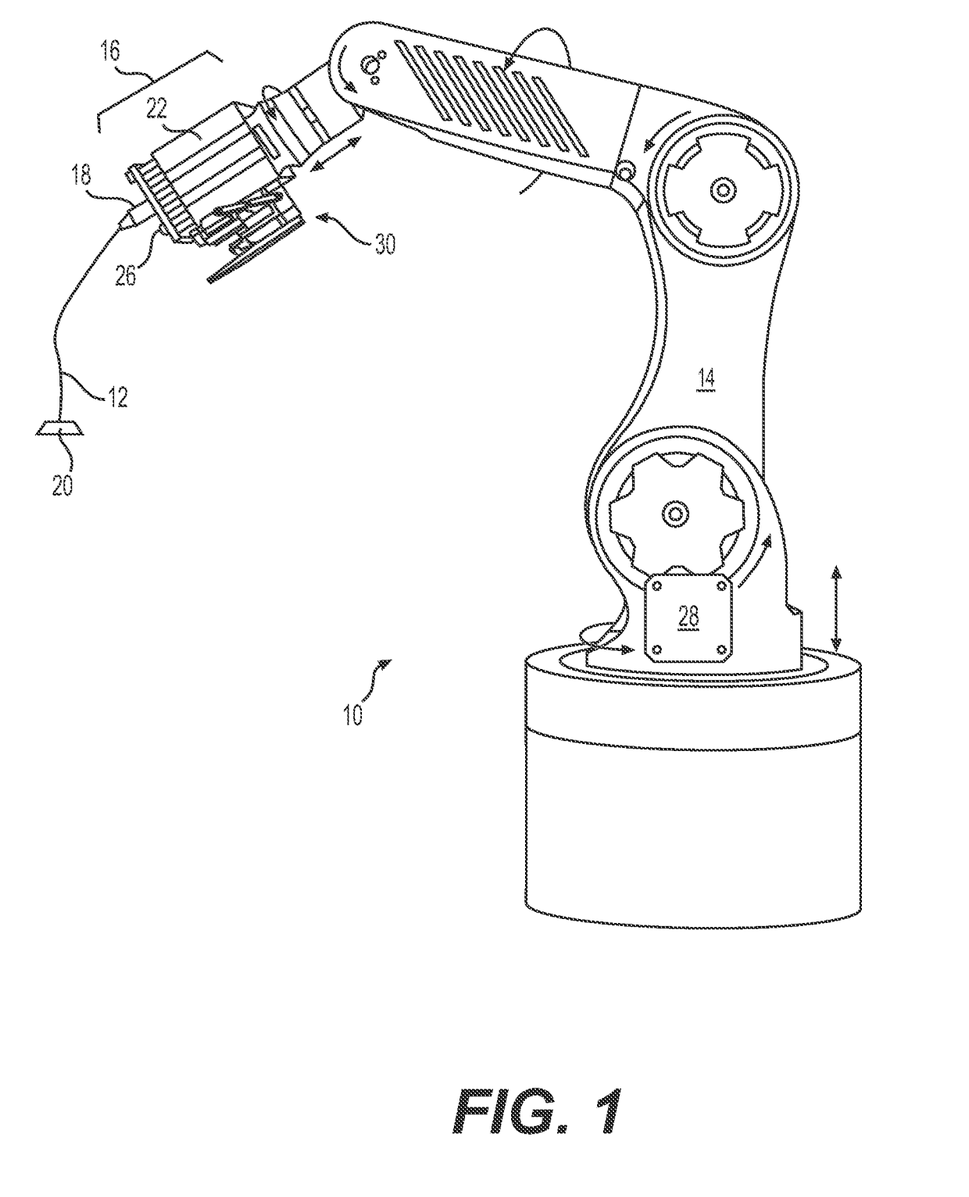
FIG. 1 is a diagrammatic illustration of an exemplary disclosed additive manufacturing system.

FIG. 1 illustrates an exemplary system 10, which may be used to continuously manufacture a composite structure 12 having any desired cross-sectional shape (e.g., ellipsoidal, polygonal, etc.). System 10 may include at least a moveable support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis (e.g., six or more axes) movement, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, chilled, and/or warmed) to provide for these needs.

The matrix may be used to coat, encase, or otherwise at least partially surround (e.g., wet) any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from one or more external spools—not shown). When multiple reinforcements are simultaneously used, the reinforcements may be of the same type and have the same diameter and cross-sectional shape (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from a nozzle 18 of head 16 via at least two different modes of operation. In a first mode of operation, the matrix and reinforcement are extruded (e.g., pushed under pressure and/or mechanical force) from nozzle 18, as head 16 is moved by support 14 to create the 3-dimensional shape of structure 12. In a second mode of operation, at least the reinforcement is pulled from nozzle 18, such that a tensile stress is created in the reinforcement during discharge. In this mode of operation, the matrix may cling to the reinforcement and thereby also be pulled from nozzle 18 along with the reinforcement, and/or the matrix may be discharged from nozzle 18 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory (e.g., by creating moments that oppose gravity).

The reinforcement may be pulled from nozzle 18 as a result of head 16 moving away from an anchor point 20. In particular, at the start of structure-formation, a length of matrix-impregnated reinforcement may be pulled and/or pushed from nozzle 18, deposited onto a stationary anchor point 20, and cured, such that the discharged material adheres to anchor point 20. Thereafter, head 16 may be moved away from anchor point 20, and the relative movement may cause additional reinforcement to be pulled from nozzle 18. It should be noted that the movement of the reinforcement through head 16 could be assisted (e.g., via internal feed mechanisms), if desired. However, the discharge rate of the reinforcement from nozzle 18 may primarily be the result of relative movement between head 16 and anchor point 20, such that tension is created within the reinforcement.

Nozzle 18 may be fluidly connected to a matrix reservoir 22. Although matrix reservoir 22 is shown as being at least partially inside of head 16, it should be noted that matrix reservoir 22 and/or another wetting mechanism could alternatively be located separately from (e.g., upstream of) head 16. Nozzle 18 may be a generally cylindrical component having an upstream or base end in communication with matrix reservoir 22, a downstream or discharge tip, and one or more passages that extend from the base end to the tip end. It is contemplated that, in some embodiments, nozzle 18 may be omitted, if desired.

Any number of reinforcements (represented as R in FIGS. 2-9) may be passed axially through reservoir 22 (or another wetting mechanism—not shown), where at least some matrix-wetting occurs (matrix represented as M in FIGS. 2-9), and discharged from head 16 via nozzle 18. One or more orifices may be located at the tip end of nozzle 18 to accommodate passage of the matrix-wetted reinforcements. In the disclosed embodiment, a single generally circular orifice is utilized. It is contemplated, however, that multiple circular orifices could be used. In addition, orifices of another shape (e.g., a rectangular shape) may allow for printing of ribbons and/or sheets that do not have a circular shape.

One or more cure enhancers (e.g., one or more light sources, ultrasonic emitters, lasers, heaters, catalyst dispensers, microwave generators, etc.) 26 may be mounted proximate head 16 (e.g., around nozzle 18 or only at a trailing side of nozzle 18) and configured to enhance a cure rate and/or quality of the matrix as it is discharged from nozzle 18. Cure enhancer 26 may be controlled to selectively expose internal and/or external surfaces of structure 12 to cure energy (e.g., light energy, electromagnetic radiation, vibrations, heat, a chemical catalyst or hardener, etc.) during the formation of structure 12. The cure energy may increase a rate of chemical reaction occurring within the matrix, sinter the material, harden the material, or otherwise cause the material to cure as it discharges from nozzle 18.

A controller 28 may be provided and communicatively coupled with support 14, head 16, and any number and type of cure enhancers 26. Controller 28 may embody a single processor or multiple processors that include a means for controlling an operation of system 10. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of models, lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 28 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 26, such that structure 12 is produced in a desired manner.

In some applications, it may be beneficial to selectively sever the continuous reinforcement extending from nozzle 18, without negatively affecting a movement and/or fabrication ability of print head 16. A cutting mechanism 30 may be provided for this purpose. In the disclosed embodiment, cutting mechanism 30 is mounted directly to head 16. It is contemplated, however, that cutting mechanism 30 could alternatively be mounted to support 14 and/or to a different support that is separate from support 14 (e.g., mounted to another robotic arm).

FIGS. 2-5 illustrate an exemplary head 16 and cutting mechanism 30 that may be used together to selectively discharge and sever the matrix-wetted and/or dry continuous reinforcements of composite structure 12. As shown in these figures, cutting mechanism 30 may include, among other things, a cutting implement (e.g., shears) 32 and a motorized linkage arrangement ("arrangement"—shown in FIGS. 4 and 5) 34. Shears 32 may be actively opened and actively closed to selectively grasp and/or sever the continuous reinforcement. It is contemplated, however, that shears 32 could be only actively closed and passively opened (e.g., via a spring—not shown), if desired. It is also contemplated that shears 32 could be double-acting, wherein each opening and each closing would effect severing of the continuous reinforcement.

Figure 4:
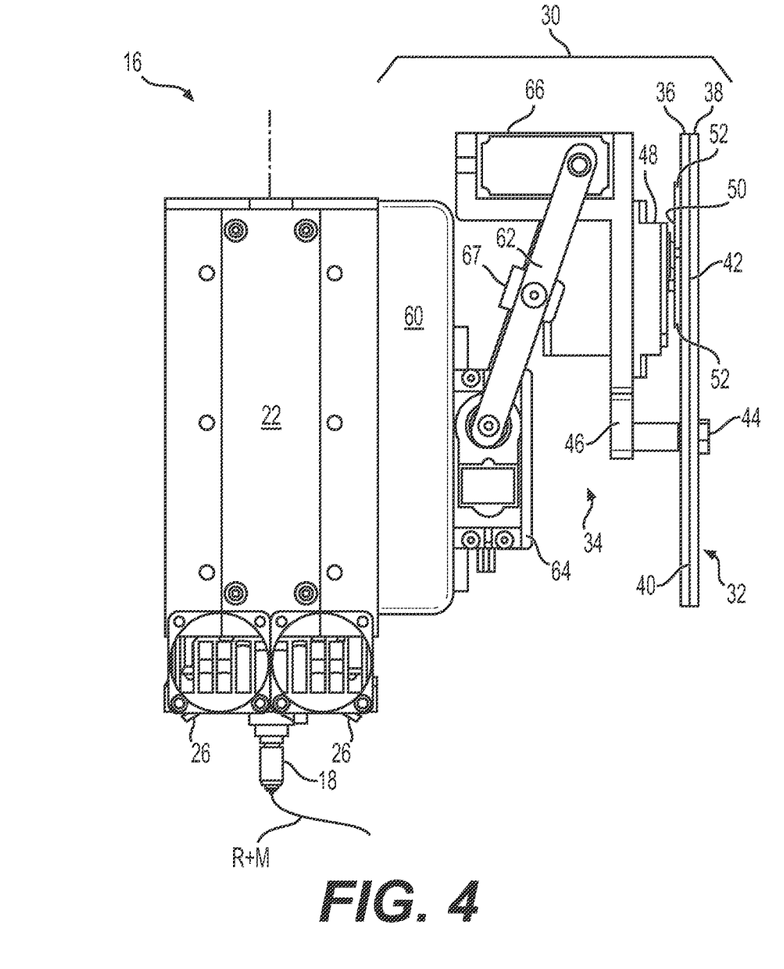
Figure 5:
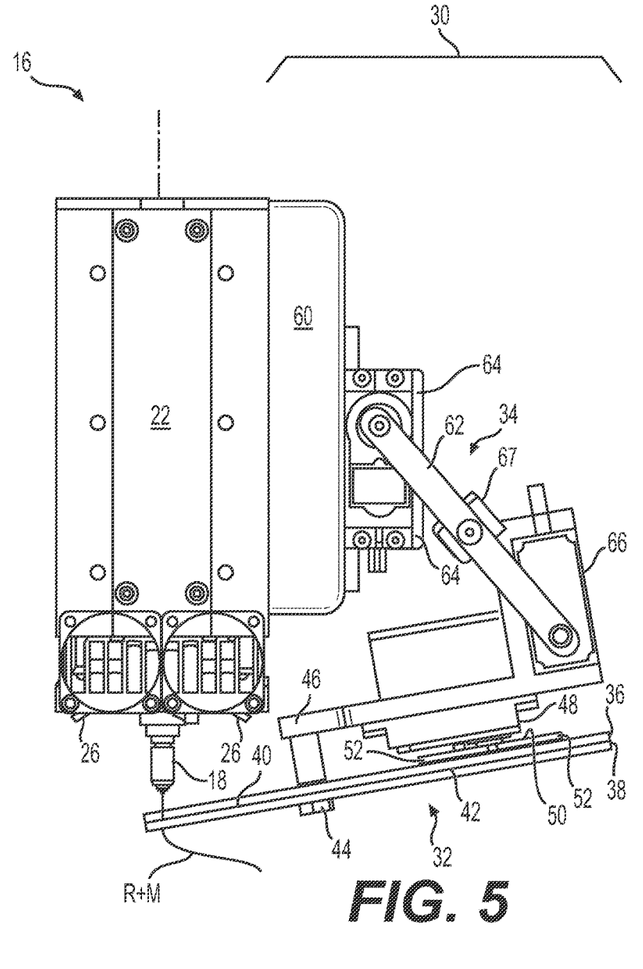

Arrangement 34 may operatively mount shears 32 to a side (e.g., a trialing side) of head 16 and be selectively energized (e.g., by controller 28—referring to FIG. 1) to cause shears 32 to open (shown in FIG. 3) and/or close (shown in FIG. 2) and also to move from a stowed position (shown in FIGS. 2-4) to a deployed position (shown in FIG. 5). When shears 32 are in the stowed position, primary surfaces (e.g., rightmost surfaces shown in FIG. 4) of shears 32 may be generally aligned (e.g., within 0-15°) with a central axis of nozzle 18. When shears 32 are in the deployed position, the primary surfaces of shears 32 may be generally perpendicular (e.g., within 0-15°) to the central axis of nozzle 18.

Shears 32 may include at least one (e.g., first and second) arms 36, 38, each having a blade (e.g., a smooth, serrated, straight, and/or curved edge) 40 formed at one end and a lever 42 formed at an opposing second end. A common fastener (e.g., a rivet, a bolt, or a screw) 44 may pass through a mid-portion of each of arms 36, 38 and into a mounting bracket 46. With this configuration, arms 36, 38 may be pivoted about fastener 44. For example, a force applied to levers 42 that urges levers 42 away from each other may cause arms 36, 38 to pivot in opposing directions and move blades 40 towards each other (i.e., to close) to close on or otherwise engage the continuous reinforcement. In contrast, a force applied to levers 42 that urges levers 42 towards each other may cause arms 36, 38 to pivot and move blades 40 away from other (i.e., to open).

Figure 2:
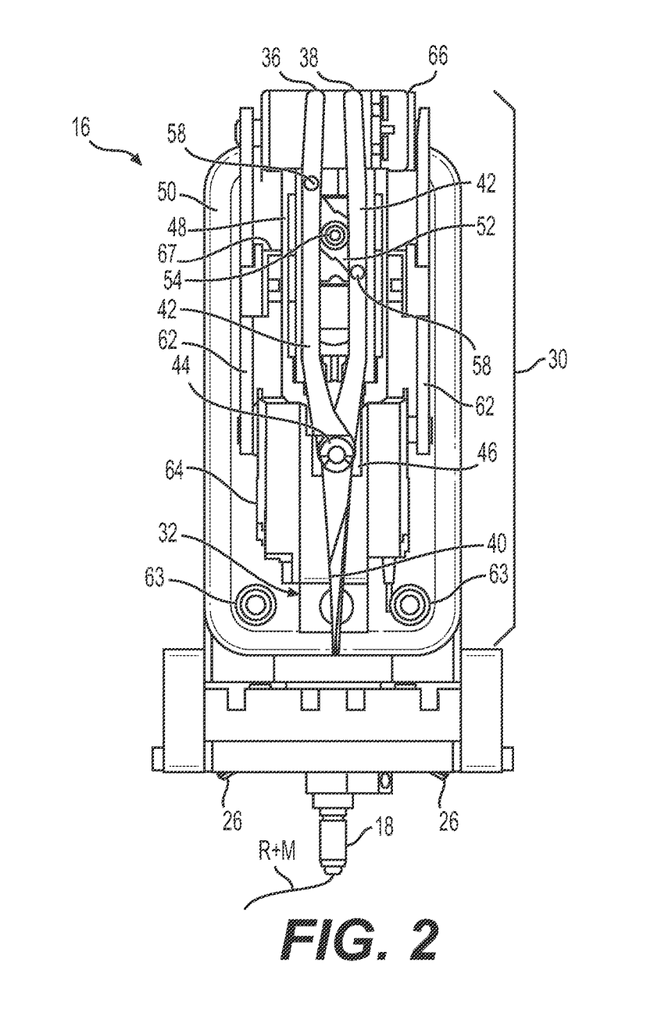
FIGS. 2, 3, and 4 are side-view illustrations of an exemplary print head and cutting mechanism that may be utilized with the additive manufacturing system of FIG. 1.
Figure 3:
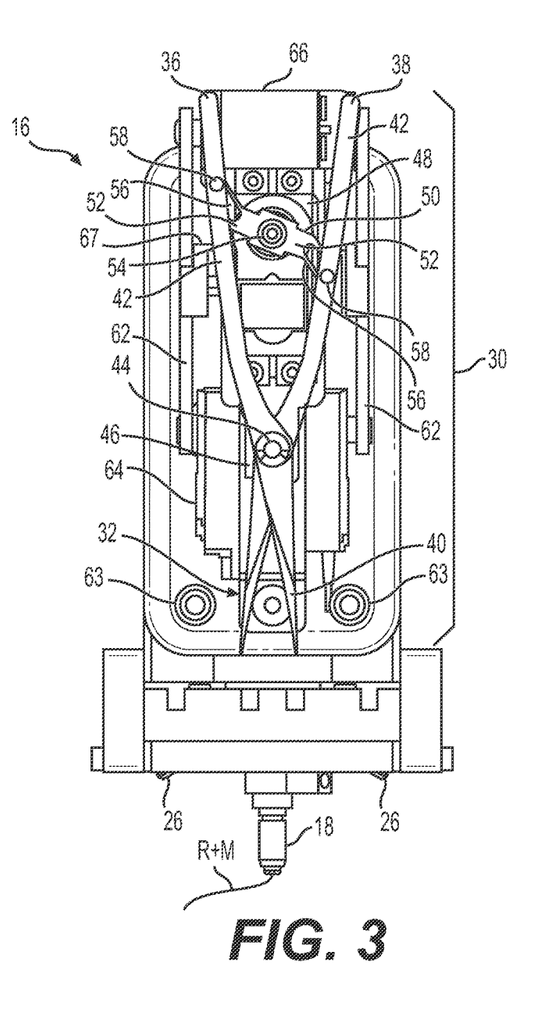

As shown in FIGS. 2 and 3, one or more actuators of arrangement 34 may function to apply the above-described forces. For example, a single rotary actuator (e.g., an electrical stepper motor) 48 may generate both of the forces described above for use in actively opening and actively closing arms 36, 38. Rotary actuator 48 may be connected to arms 36, 38 by way of an S-shaped or parallel-offset link 50. In particular, link 50 may include elongated protrusions 52 that extend along opposing parallel trajectories that are radially offset from a central bore 54. Central bore 54 may be configured to receive a rotating shaft of rotary actuator 48 (e.g., via a splined interface). Each of protrusions 52 may include an elongated slot 56 (shown only in FIG. 3), in which a corresponding pin 58 associated with arms 36, 38 may be received. As the shaft of rotary actuator 48 is driven in a counterclockwise direction (e.g., starting from the stowed position shown in FIG. 2), pins 58 may slide radially outward within slot 56 and away from the shaft to distal end points of slots 56, thereby opening arms 36, 38. In contrast, as the shaft of rotary actuator 48 is driven in a clockwise direction (e.g., starting from the deployed position shown in FIG. 2), pins 58 may slide radially inward within slot 56 and towards the shaft to proximal end points of slots 56, thereby closing arms 36, 38. This active opening and closing of arms 36, 38 (e.g., as opposed to only actively closing and relying on a spring force for passive opening, or vice versa) may improve a reliability of fiber severing, even during buildup of resin on arms 36, 38 and/or rotary actuator 48. In addition, the active opening and closing may reduce a resistance to movement (e.g., the resistance exerted by the spring), thereby allowing for faster movements of the shears and/or a smaller rotary actuator 48.

As shown in FIGS. 4 and 5, arrangement 34 may have a 3-bar open configuration, with linkage motion being generated via one or more additional actuators. The 3-bar configuration may be provided via a mounting base 60, a primary link 62, and mounting bracket 46. Mounting base 60 may be connected to the side of head 16 and/or to support 14 (referring to FIG. 1) via one or more fasteners 63 (shown only in FIGS. 2 and 3). Primary link 62 may have a first end pivotally connected to mounting base 60 via a first actuator 64 (e.g., at a splined interface), and an opposing second end pivotally connected to mounting bracket 46 via a second actuator 66 (e.g., at a splined interface). First actuator 64 may be rigidly connected to mounting base 60, while second actuator 66 may be rigidly connected to mounting bracket 46.

In the disclosed embodiment, primary link 62 includes parallel arms that are joined to each other at their midpoints (e.g., via a stiffener 67). It is contemplated, however, that the parallel arms and stiffener 67 could be replaced by a single arm or integrated into a single component.

It is contemplated that arrangement 34 could have a different configuration, if desired. For example, mounting base 60 could be omitted, and head 16 and/or support 14 may function as the base link of the 3-bar open configuration. Alternatively, the second end of primary link 62 could be rigidly connected to mounting bracket 46 and second actuator 66 could be eliminated for a 2-bar open configuration. The 2-bar open configuration, however, may have a limited range of motion.

First actuator 64 may be selectively activated to (e.g., energized to rotate and) deploy shears 32, while second actuator 66 may be selectively activated to (e.g., energized to rotate and) adjust a tilt angle of shears 32 relative to the axis of nozzle 18. It is contemplated that controller 28 may energize first and second actuators 64, 66 sequentially or simultaneously, as desired. It is also contemplated that the tilt angle may remain fixed, in some applications.

Another exemplary cutting mechanism 68 is illustrated in FIGS. 6-9 as being usable with head 16. Like cutting mechanism 30 of FIGS. 2-5, cutting mechanism 68 may include a cutting implement (e.g., shears) 32 having arms 36, 38 and blades 40. Cutting mechanism may also include link 50 and rotary actuator 48 configured to rotate link 50 and thereby cause arms 36, 38 to open and/or close blades 40. However, in contrast to cutting mechanism 30 of FIGS. 2-5, cutting mechanism 68 of FIGS. 6-9 is not pivoted between stowed and extended positions by a linkage arrangement.

Figure 6:
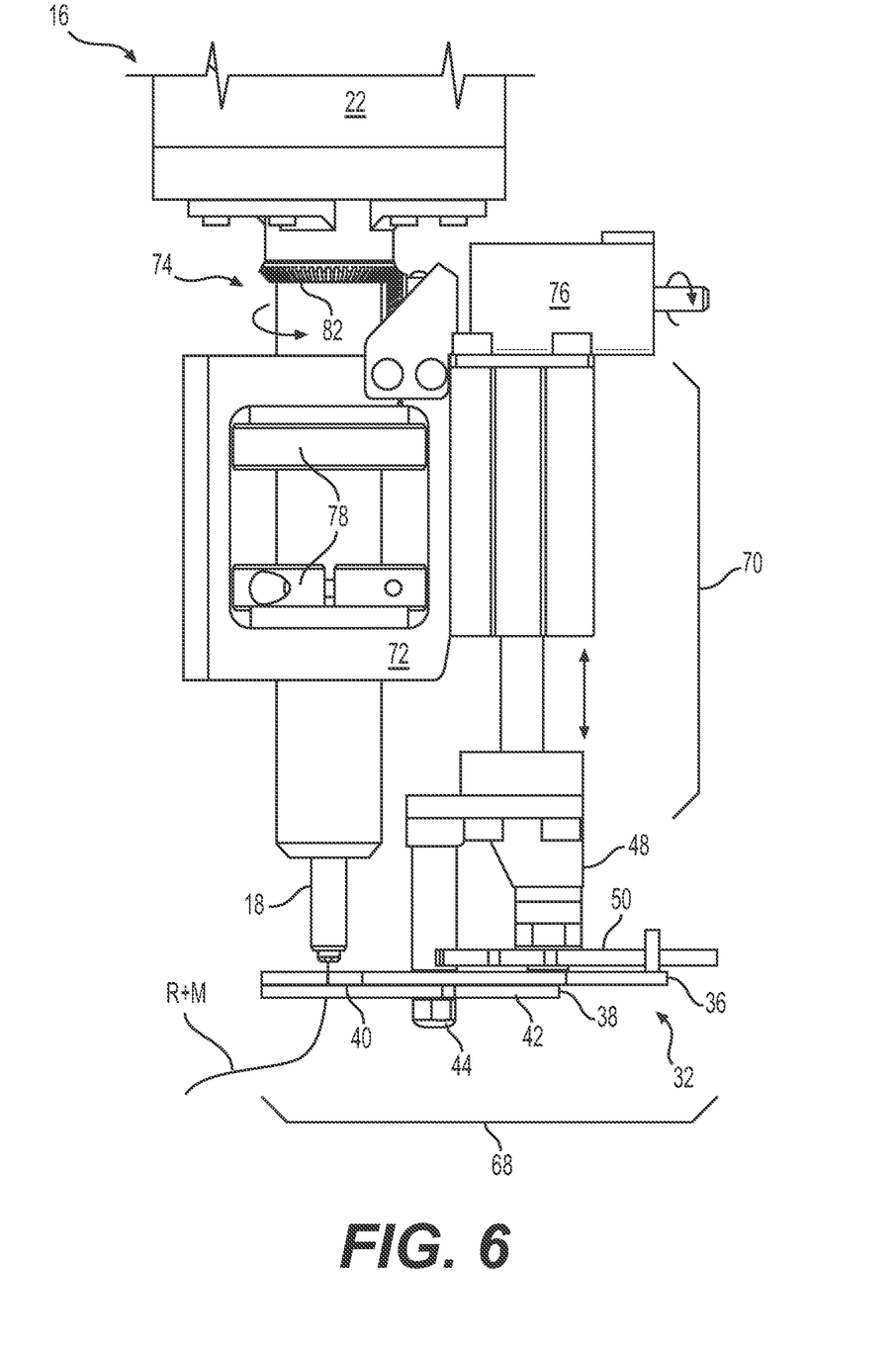
Figure 7:
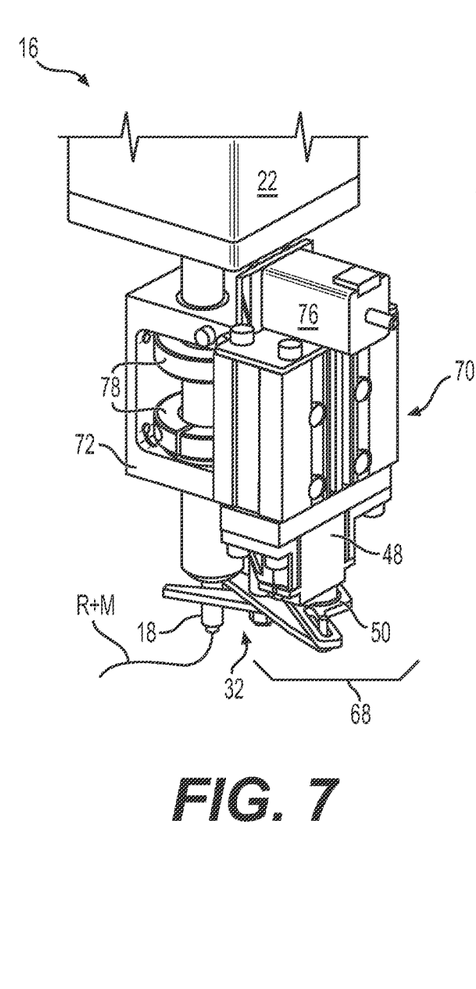
Figures 8, 9:
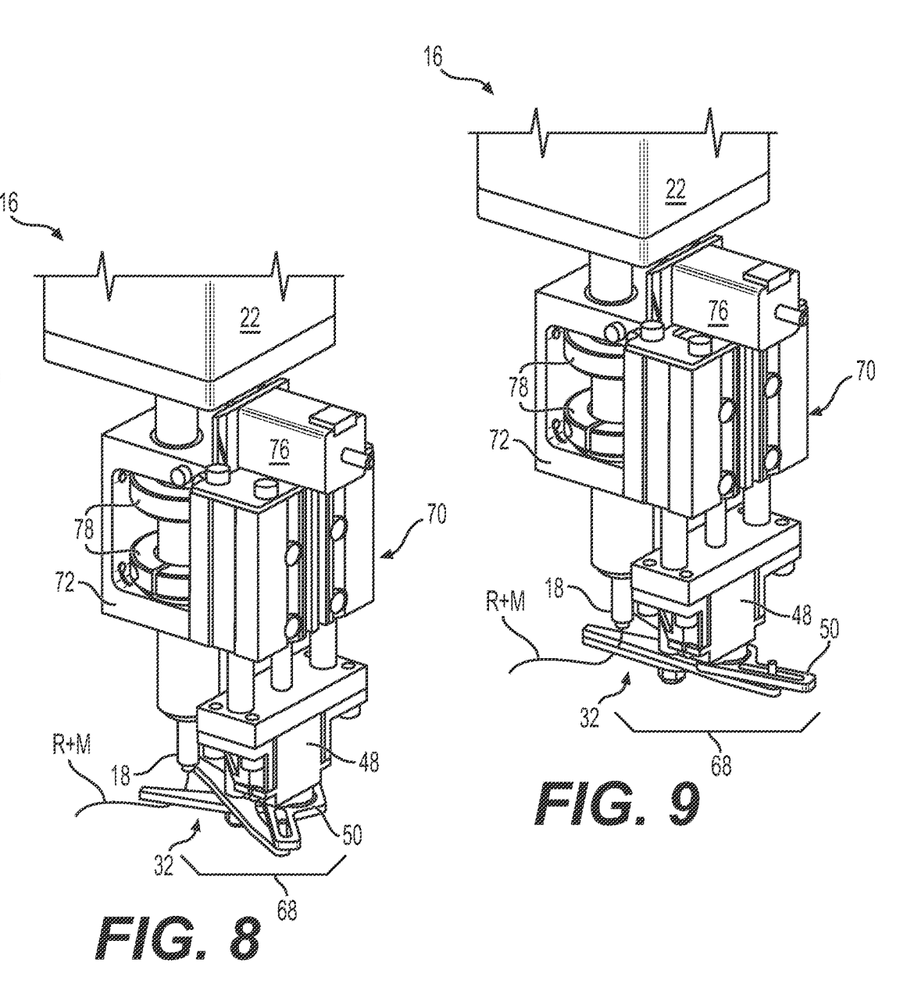

Cutting mechanism 68 may be selectively translated in an axial direction of head 16 between a stowed position (e.g., closer to reservoir 22 and at a base end of nozzle 18—see FIG. 7) and an extended position (e.g., away from reservoir 22 and past a tip end of nozzle 18—see FIGS. 6, 8, and 9) by way of a linear actuator 70. It should be noted that cutting mechanism 68 may only be moved to the stowed position when blades 40 are open, such that blades 40 straddle nozzle 18 (see FIG. 7). The linear motion may take less time, be more accurate, and/or require less operational space, as compared to the pivoting motion of cutting mechanism 30. In the disclosed example, linear actuator 70 is a hydraulic or pneumatic cylinder. It is contemplated that another linear actuator (e.g., a lead screw) could alternatively be utilized to move cutting mechanism 68 between the stowed and extended positions.

In some applications, head 16 may pivot during directional changes, such that one side of head 16 is always the trailing side. This may be true for the embodiment of FIGS. 2-5, where cutting mechanism 30 is rigidly connected to head 16. However, in other applications, head 16 may change printing directions without a corresponding pivoting movement. In these applications, it may be important to mount the associated cutting mechanism in an adjustable manner, such that the cutting mechanism can be selectively positioned at different sides of head 16 depending on the current travel direction. Cutting mechanism 68 is shown as being adjustably mounted to head 16. It should be noted that cutting mechanism 68 could alternatively be fixedly mounted in the manner of cutting mechanism 30 and/or that cutting mechanism 30 could be adjustably mounted in the manner of cutting mechanism 68, if desired.

Cutting mechanism 68 may be adjustably mounted to head 16 via a bracket 72, a gear arrangement 74, and a rotary actuator 76. For example, bracket 72 may extend between linear actuator 70 and one or more collar bearings 78 that are rigidly connected to nozzle 18 (and/or a cylindrical extension between reservoir 22 and nozzle 18). Rotary actuator 76 may be mounted to an end of linear actuator 70 opposite cutting mechanism 68, and include a shaft engaged with an input portion (e.g., a first helical gear) 80 of gear arrangement 74. Gear arrangement 74 may additionally include an output portion (e.g., a second helical gear) 82 linked (e.g., intermeshed) with input portion 80 and rigidly connected to head 16 (e.g., around the base end of nozzle 18). With this configuration, as rotary actuator 76 is energized (e.g., by controller 28—referring to FIG. 1), a torque may be generated that causes first helical gear 80 to rotate. Due to the intermeshing of first helical gear 80 with second helical gear 82 and the fixed nature of second helical gear 82, the generated torque may cause first helical gear 80, rotary actuator 76, linear actuator 70, bracket 72, and cutting mechanism 68 to pivot about nozzle 18.

INDUSTRIAL APPLICABILITY

The disclosed system may be used to continuously manufacture composite structures having any desired cross-sectional size, shape, length, density, and/or strength. The composite structures may be fabricated from any number of different reinforcements of the same or different types, diameters, shapes, configurations, and consists, each coated with a variety of matrixes. In addition, the disclosed cutting mechanisms may allow automated severing and/or fiber anchoring via a compact arrangement that preserves the system's range of motion. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, primary load paths, support requirements, cutting requirements, anchoring requirements, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing reinforcements from internal and/or external spools down through matrix reservoir 22, and then threading the reinforcements through nozzle 18. Installation of the structural matrix may include filling reservoir 22 within head 16 and/or coupling of one matrix sources to head 16. Head 16 may then be moved by support 14 under the regulation of controller 28 to cause matrix-coated reinforcements (i.e., continuous reinforcements that are coated in the structural matrix) to be placed against or on a corresponding stationary anchor point 20. Cure enhancers 26 within head 16 may then be selectively activated to cause hardening of the structural matrix surrounding the continuous reinforcements, thereby bonding ends of the continuous reinforcements to anchor point 20.

The component information may then be used to control operation of system 10. For example, the continuous reinforcements may be pulled and/or pushed from nozzle 18 (along with the structural matrix), while support 14 selectively moves head 16 in a desired manner during curing, such that an axis of the resulting structure 12 follows a desired trajectory (e.g., a free-space, unsupported, supported, and/or 3-D trajectory).

It has been determined that, in some instances, unintentional shrinkage and/or growth of composite material may occur during printing. For example, some matrixes may naturally shrink during exposure to energy from cure enhancers 26 and/or pressure from overlapping layers, and this shrinkage could compound as more and more layers of structure 12 are printed on top of each other. In addition, shrinkage may compound in a particular direction due to cure energy trajectory, cure energy intensity, gravitational force vectors, and other factors, which may change as structure 12 grows in size. Similarly, some matrixes may naturally expand or otherwise build up during exposure to energy from cure enhancers 26 and/or pressure from overlapping layers, and this expansion could compound as more and more layers of structure 12 are printed on top of each other. In these situations, when laying down material (e.g., matrix-wetted continuous reinforcements or matrix only) over previously discharge layers, the compounding shrinkage and/or growth could have the potential to disrupt high-quality printing. For example, the accumulating dimensional changes could cause warping of structure 12.

In the disclosed embodiment, controller 28 may be configured to selectively account for these accumulating dimensional changes. For example, controller 28 may be configured to change (e.g., reduce or increase) a nozzle height (a.k.a., a z-step of head 16) by an amount proportional or otherwise related to the estimated shrinkage and/or growth for each layer within an overlapping area of structure 12. The dimensional change of each layer may be estimated based on an orifice diameter of nozzle 18, a diameter of the continuous reinforcement, a fiber-to-resin ratio, a type of resin, a cure parameter (e.g., an exposure intensity and/or duration), an estimated interlayer pressure, a z-dimension thickness, a number of overlapping layers, etc. For instance, as more and more layers are deposited in an overlapping manner within a common area of structure 12, controller 28 may incrementally change (e.g., reduce or increase) the Z-step by a greater amount with each successive layer.

Once structure 12 has grown to a desired size and/or length, structure 12 may be disconnected (e.g., severed) from head 16 in any desired manner. Severing of the continuous fiber extending from head 16 may be accomplished via cutting mechanism 30. For example, when controller 28 determines that severing of the continuous fiber may be beneficial, controller 28 may cause support 14 to move head 16 away from structure 12 a distance that provides clearance for shears 32. This movement may also cause the continuous reinforcement to be pulled taut, which may aid in the severing process.

At this point in time, one or more of actuators 48, 64, and 66 may be selectively activated to pivot shears 32 from the stowed position into the deployed position and/or to open shears 32. For example, actuator 64 may be selectively energized to cause pivoting of shears 32 through an angle of about 75-105° (e.g., about 90°). At about this same time (e.g., before, during, and/or after the movement of shears 32 from the stowed position to the deployed position), actuator 66 may adjust the tilt angle of shears 32 before or at the same time that actuator 48 causes blades 40 to move away from each other. By the end of this motion, blades 40 should be apart from each other and located at opposing sides of the continuous reinforcement.

Actuator 48 may then be energized to bring blades 40 towards each other, thereby severing the continuous reinforcement. Actuators 64 and 66 may then be energized to return shears 32 to the stowed position and tilt angle.

It is contemplated that, in some embodiments (e.g., in embodiments where blades 40 are not serrated), the closing motion of shears 32 may be implemented at the same time as the movement toward the stowed position and/or during tilt angle adjustment. For example, while blades 40 are closing on the continuous reinforcement, actuators 64 and/or 66 may be energized to pull blades 40 radially away the continuous reinforcement, such that the blades slide along the reinforcement in a slicing motion. This may help to reduce bunching of the reinforcement during cutting.

It is also contemplated that shears 32 may be selectively used during the anchoring process (and/or other discharging processes), if desired. For example, rather than the anchoring motion described above being performed by support 14 moving head 16 away from anchor point 20, it is contemplated that shears 32 could be caused to close upon the continuous reinforcement extending from nozzle 18 and pull the continuous reinforcement further out of nozzle 18 (e.g., via movement toward the stowed position) without severing the continuous reinforcement. In addition, shears 32 could be used to place the pulled-out continuous reinforcement on anchor point 20 (or on another surface), in some applications. In these applications, shears 32 could be temporarily provided with grasping tips (e.g., rubberized tips) that increase friction and/or inhibit fiber damage. In addition, actuator 48 may be regulated to limit the closing amount of blades 40, so as to inhibit fiber damage.

Severing of the continuous fiber extending from head 16 may alternatively be accomplished via cutting mechanism 68 (referring to FIGS. 7-9). For example, when controller 28 determines that severing of the continuous fiber may be beneficial, controller 28 may cause cutting mechanism 68 to be pivoted about nozzle 18 to a desired (e.g., trailing) side of head 16 via selective energizing of rotary actuator 76. During and/or after this pivoting motion, linear actuation 70 may be selectively energized to extend cutting mechanism 68 from the stowed position of FIG. 7 to the deployed position of FIG. 8. Actuator 48 may then be energized to bring blades 40 towards each other, thereby severing the continuous reinforcement (See transition from FIG. 8 to FIG. 9).

After the continuous reinforcement has been successfully severed, blades 40 may be moved away from each other (e.g., via reverse motion and/or de-energizing of actuator 48). Cutting mechanism 68 may be then be returned to the stowed position via retraction of linear actuator 70.

Severing of the continuous reinforcement may be coordinated with curing of the associated matrix coating the continuous reinforcement. For example, it may require less force from and result in less wear on blades 40 if the matrix coating the continuous reinforcement is uncured during severing. Accordingly, controller 28 may selectively inhibit cure enhancer(s) 26 from directing cure energy to the portion of the continuous reinforcement that is to be severed. In another example, the continuous reinforcement may be too flexible when the associated matrix coating is uncured (e.g., when tension in the reinforcement is low), allowing the continuous reinforcement to wrap around, deflect, and/or bind blades 40 during severing. Accordingly, controller 28 may selectively delay severing until after the matrix is sufficiently cured. Other strategies for curing the matrix and severing the continuous reinforcement may also be employed.

It will be apparent to those skilled in the art that various modifications and variations can be made to the disclosed system and cutting mechanism. Other embodiments will be apparent to those skilled in the art from consideration of the specification and practice of the disclosed system and cutting mechanism. For example, it is contemplated that blades 40 could be selectively augmented and/or replaced with dedicated pinchers, grabbers, a pick, a matrix deliver device (e.g., a tube), or another similar mechanism used to pull, hold, and/or place the continuous reinforcement. It is intended that the specification and examples be considered as exemplary only, with a true scope being indicated by the following claims and their equivalents.

What is claimed is:

1. A system for additively manufacturing a composite structure, comprising:
   a print head configured to discharge a continuous reinforcement;
   a support configured to move the print head in at least one dimension during discharge; and
   a cutting mechanism connected to at least one of the print head and the support and configured to selectively sever the continuous reinforcement from the print head, the cutting mechanism including:
   a cutting implement;
   a first actuator configured to move the cutting implement from a stowed position to a deployed position; and
   a second actuator configured to cause the cutting implement to sever the continuous reinforcement at the deployed position.

2. The system of claim 1, wherein:
   the cutting implement includes shears; and
   the second actuator is configured to at least one of open the shears and close the shears on the continuous reinforcement.

3. The system of claim 2, wherein the second actuator is configured to actively open and actively close the shears.

4. The system of claim 2, wherein:
   the shears are about parallel with a central axis of the print head when in a stowed position; and
   the shears are about perpendicular to the central axis when in a deployed position.

5. The system of claim 1, further including at least one link pivotally connecting the cutting mechanism to the at least one of the print head and the support, wherein the first actuator is a rotary actuator connected to move the at least one link.

6. The system of claim 5, wherein the at least one link includes a 3-bar open arrangement.

7. The system of claim 5, further including a third actuator configured to tilt the cutting mechanism relative to the print head.

8. The system of claim 7, wherein the third actuator pivots with the at least one link.

9. The system of claim 1, further including a controller configured to cause the support to move the print head, and to selectively energize the first and second actuators.

10. The system of claim 9, wherein:
    the continuous reinforcement is at least partially coated with a matrix while inside of the print head;
    the system further includes a cure enhancer configured to expose the matrix to a cure energy at discharge from the print head; and
    the controller is further configured to:
    selectively activate the cure enhancer during discharge; and
    selectively inhibit the cure enhancer from curing a portion of the continuous reinforcement that is to be severed by the cutting mechanism.

11. The system of claim 9, wherein the controller is further configured to:
    selectively cause the print head to discharge the continuous reinforcement and the matrix in overlapping layers to increase a z-height dimension;
    selectively cause the support to step the print head a distance in the z-height dimension between each overlapping layer; and
    selectively adjust the distance of the step as a function of at least one of the z-height dimension and a number of layers overlapping in the z-height dimension.

12. The system of claim 1, wherein the first actuator is a linear actuator configured to extend and retract the cutting mechanism in a direction aligned with an axis of the print head.

13. The system of claim 12, further including a third actuator configured to pivot the cutting mechanism and the linear actuator about a nozzle of the print head.

14. The system of claim 13, further including a gear arrangement disposed between the third actuator and the print head.

15. The system of claim 13, further including at least one collar bearing connecting the cutting mechanism to the print head.

16. The system of claim 1, wherein:
    the cutting implement includes shears; and
    blades of the shears straddle a nozzle of the print head only when the cutting mechanism is in a deployed position.

17. A system for additively manufacturing a composite structure, comprising:
    a print head configured to discharge a continuous reinforcement that is at least partially wetted with a matrix;
    a support configured to move the print head in multiple dimensions during discharge;
    a cure enhancer configured to initiate curing of the matrix at discharge;
    a cutting mechanism connected to at least one of the print head and the support and configured to selectively sever the continuous reinforcement from the print head, the cutting mechanism including:
    shears;
    a first actuator configured to move the shears from a stowed position to a deployed position; and
    a second actuator configured to at least one of open and close the shears to cause the shears to sever the continuous reinforcement; and
    a controller configured to cause the support to move the print head, to selectively energize the first and second actuators, and to selectively activate the cure enhancer.

18. The system of claim 17, wherein the controller is configured to inhibit the cure enhancer from curing a portion of the continuous reinforcement that is to be severed by the cutting mechanism.

19. The system of claim 17, wherein the controller is further configured to:
    selectively cause the print head to discharge the continuous reinforcement and the matrix in overlapping layers to increase a z-height dimension;

selectively cause the support to step the print head a distance in the z-height dimension between each overlapping layer; and selectively adjust the distance of the step as a function of at least one of the z-height dimension and a number of layers overlapping in the z-height dimension.

20. A system, comprising:

a print head configured to discharge a continuous reinforcement that is at least partially wetted with a matrix;

a support configured to move the print head in multiple dimensions during discharge;

a cure enhancer configured to initiate curing of the matrix at discharge; and a controller configured to:
  selectively activate the cure enhancer;
  selectively cause the print head to discharge the continuous reinforcement and the matrix in overlapping layers to increase a z-height dimension;
  selectively cause the support to step the print head a distance in the z-height dimension between each overlapping layer; and
  selectively adjust the distance of the step as a function of at least one of the z-height dimension and a number of layers overlapping in the z-height dimension.

* * * * *